United States Patent [19]
Castillo

[11] Patent Number: 4,551,899
[45] Date of Patent: Nov. 12, 1985

[54] APPARATUS FOR THREADING CHAIN ONTO A LAMP CORD

[75] Inventor: Richard A. Castillo, Newbury Park, Calif.

[73] Assignee: Modulite Corporation, Montebello, Calif.

[21] Appl. No.: 667,004

[22] Filed: Dec. 10, 1984

Related U.S. Application Data

[62] Division of Ser. No. 445,021, Nov. 29, 1982, Pat. No. 4,506,427.

[51] Int. Cl.[4] .............................................. B23P 19/04
[52] U.S. Cl. ..................................................... 29/241
[58] Field of Search ................................... 29/433, 241

[56] References Cited

U.S. PATENT DOCUMENTS

| | | | |
|---|---|---|---|
| 2,045,884 | 6/1936 | Sundback | 29/433 |
| 3,773,169 | 11/1973 | Zahuranac | 29/241 |
| 3,913,630 | 10/1975 | Rubey | 29/241 |
| 4,315,362 | 2/1982 | Pigford et al. | 29/241 |
| 4,338,714 | 7/1982 | Powderly | 29/433 |
| 4,388,753 | 6/1983 | Brookes | 29/433 |

Primary Examiner—Howard N. Goldberg
Assistant Examiner—Steven Nichols
Attorney, Agent, or Firm—Gene W. Arant; Paul H. Ware

[57] ABSTRACT

Method and apparatus for threading a lamp cord through links in a lamp-supporting chain, for example, swag lamps. Selected links may be chosen to receive the lamp cord, that is, every fourth link, for example.

3 Claims, 6 Drawing Figures

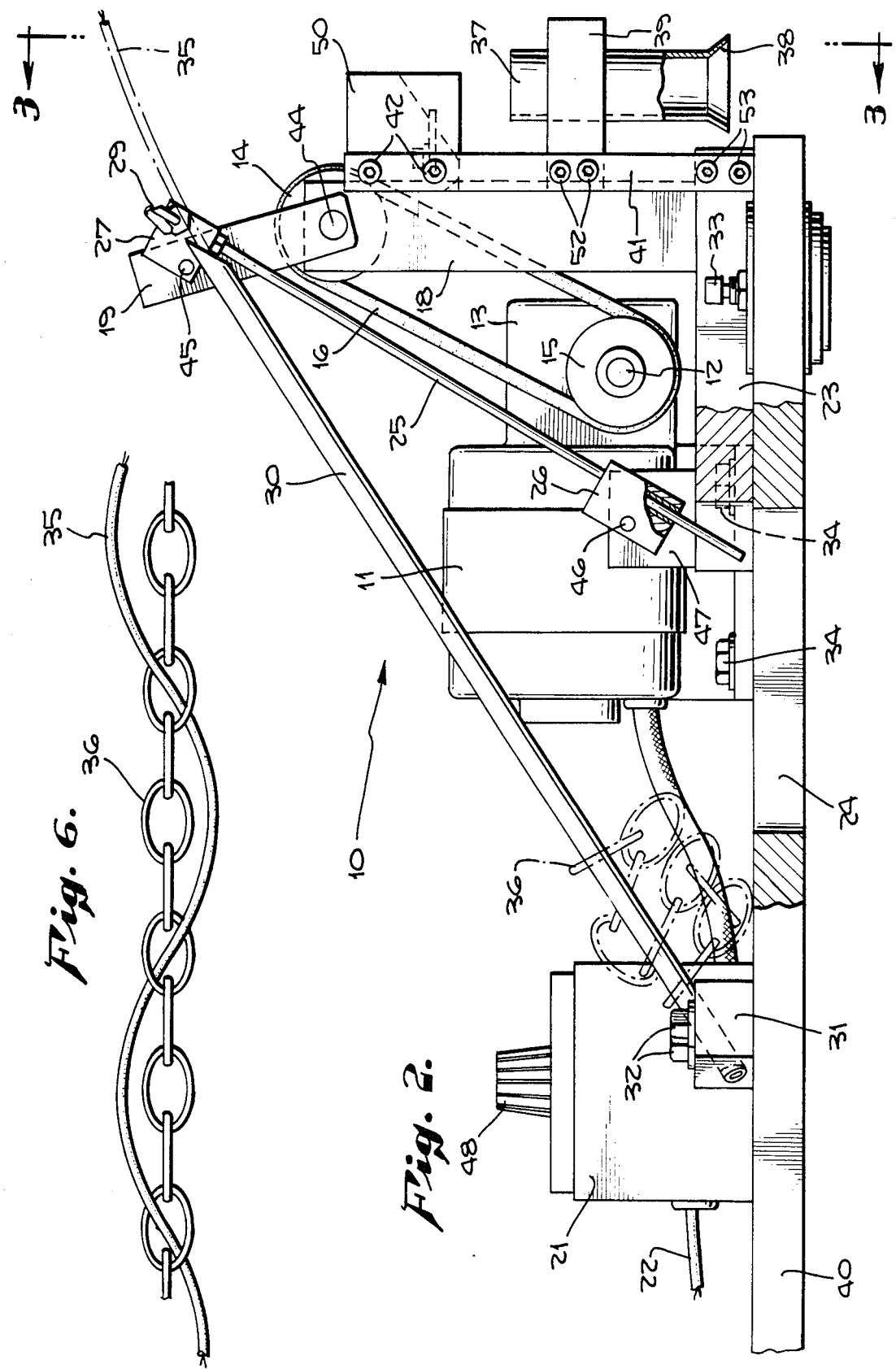

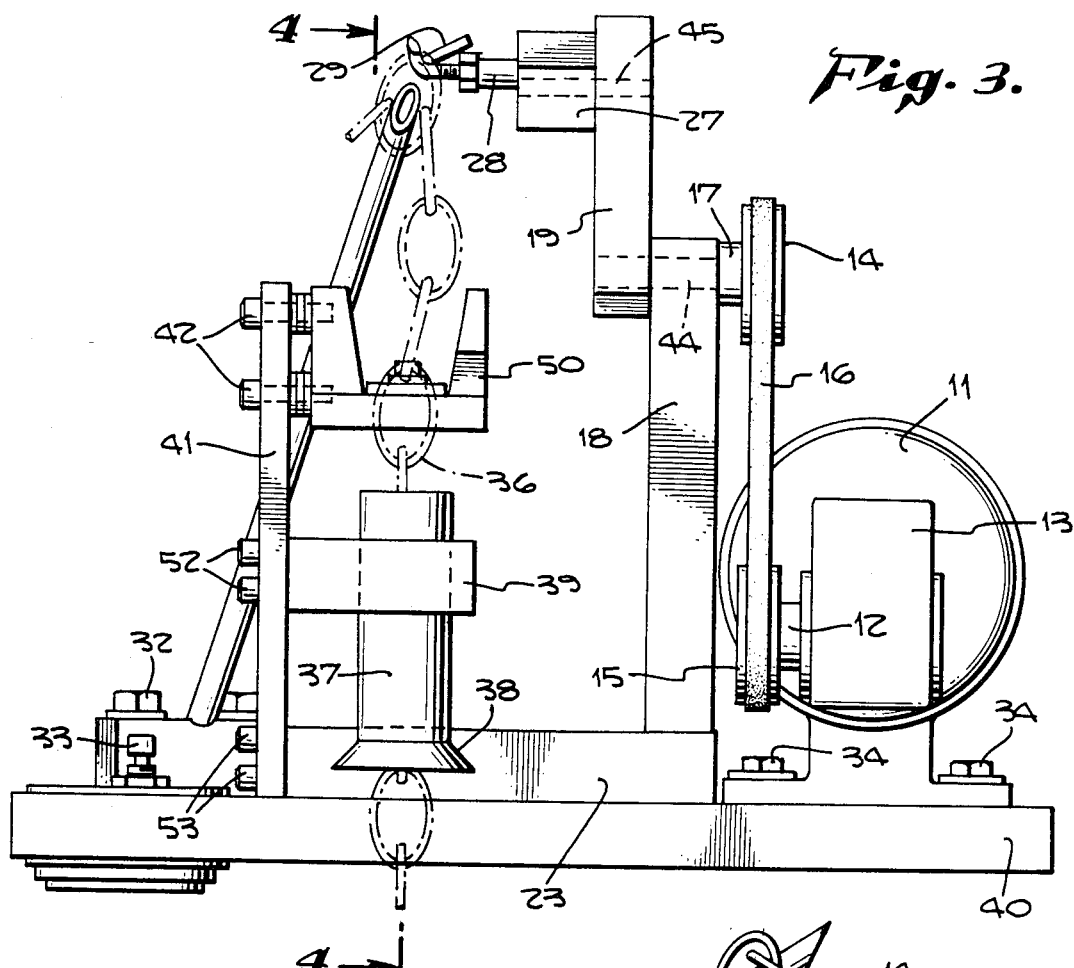
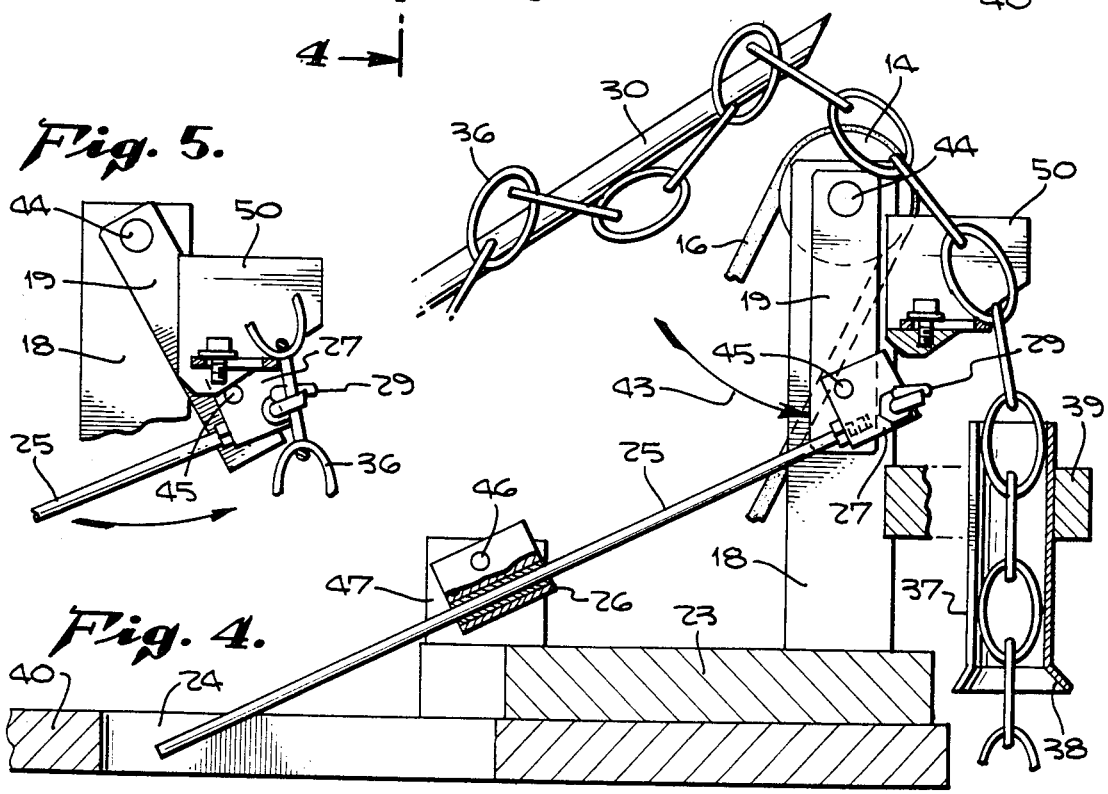

APPARATUS FOR THREADING CHAIN ONTO A LAMP CORD

This application is a division of Ser. No. 445,021, filed Nov. 29, 1982, now U.S. Pat. No. 4,506,427.

This invention relates generally to lighting fixtures and more particularly to lighting fixtures that are intended to be suspended by means of a supporting chain through which the electric lamp cord is to be threaded.

It is standard procedure in the fabrication of such lighting fixtures to thread the electric lamp cord through the links of the supporting chain by hand. This procedure is tedious and time-consuming and furthermore expensive in costs of labor. The present invention performs the threading operation automatically by means of the inventive device to be described.

It is thus an object of the present invention to provide an apparatus by means of which an electric lamp cord may be threaded through links of a light fixture supporting chain automatically.

A further object of the present invention is to provide an automatic threading machine that is safe, simple, and economical to operate.

In the accomplishment of these and other objects, an apparatus for threading chain onto a lamp cord is provided in which a lamp cord may be threaded into selective chain links of a supporting chain, for example, every third link, every fourth link, or every $n^{th}$ link, as the operator may select.

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 2 is a side elevational view as indicated by the sight lines 2—2 of FIG. 1.

FIG. 3 is a front elevational view of the device as indicated by the sight lines 3—3 of FIG. 2 showing one link of the supporting chain in engagement with the mechanism of the device.

FIG. 4 is a side view of the device taken along the sight lines 4—4 of FIG. 3.

FIG. 5 is a detailed drawing of a part of the mechanism of the device helpful in explaining the engagement of the mechanism of the device with the supporting chain.

FIG. 6 is a detailed drawing showing a lamp cord threaded through a supporting chain as contemplated by the invention.

DETAILED DESCRIPTION

Figure 1:
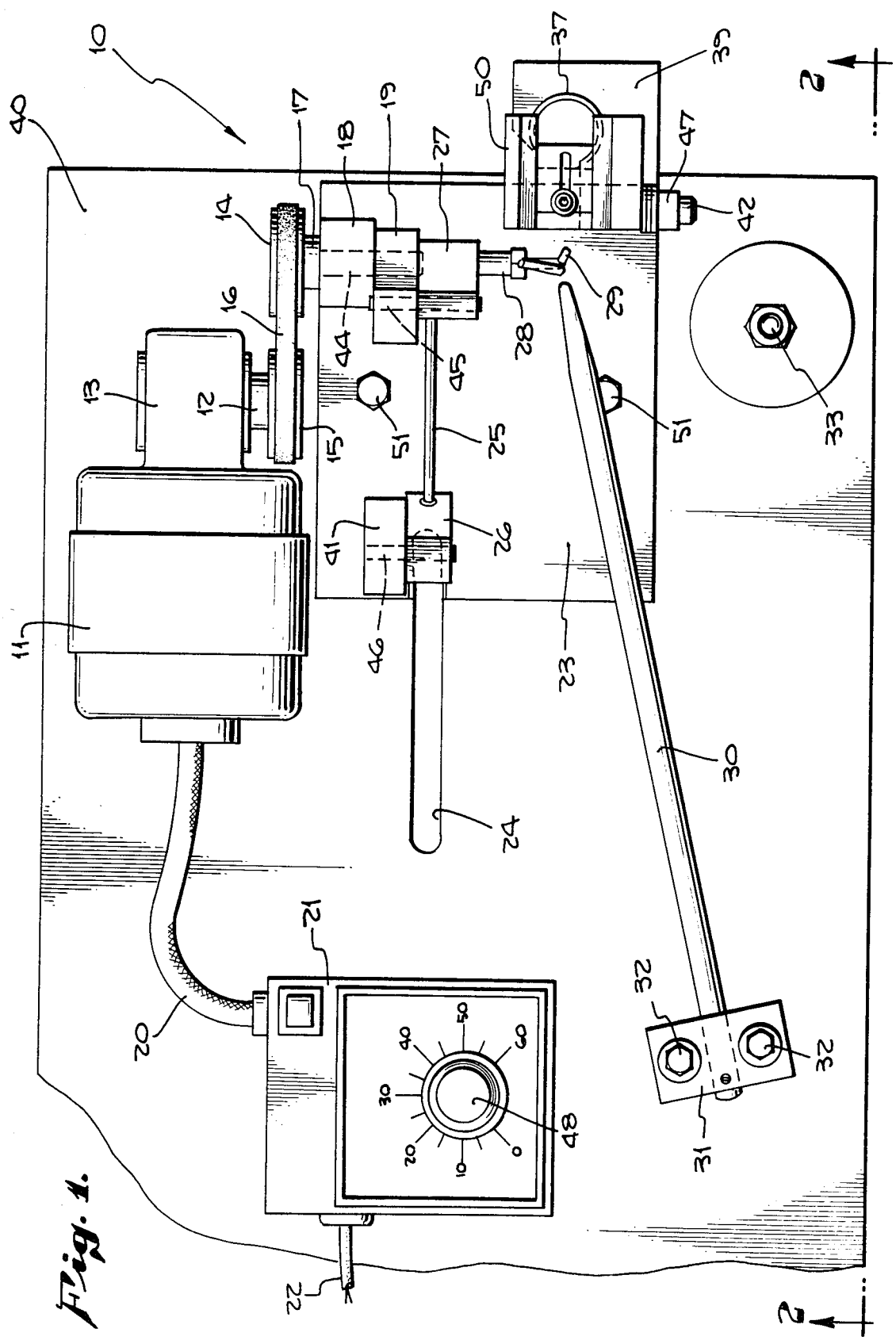
FIG. 1 is a top plan view of an emobidment of the inventive device.

Although specific embodiment of the invention will now be described with reference to the drawings, it would be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope, and contemplation of the invention as further defined in the appended claims.

Refering to FIGS. 1, 2 and 3 with greater particularity, the apparatus in general is denoted by the numeral 10. An electric power source cord 22 provides source electric power to control switch box 21, having a control knob 48. Control switch box 21 furnishes energizing power to electric motor 11 by means of motor power control cable 20. Electric motor 11 drives a gear box 13 whose gear box output shaft 12 drives a belt and pulley system. A first pulley 14 is thus driven by belt 16 by means of a second pulley 15 which is attached to gear box output shaft 12. First pulley shaft 17 drives rotating member 19 in a circular arc. Rotating member 19 is attached to first pulley 14 by means of rotating member pivot 44. In turn, pivoted head member 27 is attached to driven rotating member 19 by means of head member pivot 45. Pivoted head member 27 is thus driven in an arc 43 smaller than the arc described by rotating member 19. Chain link engaging fingers 29 are attached to pivoted head member 27 by an arm 28. Rotating member 19 and pivoted head member 27 are maintained in stable position by means of support member 18 which is firmly attached to platform 23. The motion and orientation of pivoted head member 27 and thus the resultant motion of chain link engaging fingers 29 is further constrained by means of an elongated, cylindrical crosshead shaft 25 that moves in a pivoted crosshead 26. Pivoted crosshead 26 is attached to crosshead support 47 by means of crosshead pivot 46. A slot 24 in platform 23 allows elongated, cylindrical crosshead shaft 25 to travel below the level of platform 23.

An elongated, cylindrical hollow lamp cord chute 30 is bolted to a base 40 by means of bracket 31 and fastening bolts 32. A chain feed fixture 50 is attached to a support member 41 by means of bolts 42. Support member 41 further provides support and position for a chain guide sleeve 37 having a bottom flare 38 by means of bracket 39 attached to said support member 41 by means of bolts 52. Support member 41 is in turn secured to platform 23 by means of bolts 53.

In operation, the lamp cord 35 (FIG. 2) is fed through elongated cylindrical hollow lamp cord chute 30 after a chain 36 has been first threaded onto said elongated cylindrical hollow lamp cord chute 30 by means of the action of the apparatus. Operation of control knob 48 so as to supply source electric power to electric motor 11 causes driving of gear box 13 and the resultant rotation of gear box output shaft 12. First pulley 14 thus drives first pulley shaft 17 so as to cause rotation of driven rotating member 19 about rotating member pivot 44. Thus driven rotating member 19 describes a circular arc determined by its extreme end in relation to the rotating member pivot 44. Pivot head member 27, pivoted on driven rotating member 19 by means of head member pivot 45, is further constrained in its motion and orientation by elongated cylindrical crosshead shaft 25 and pivoted crosshead 26. A chain 36, fed through chain guide sleeve 37 by way of chain feed fixture 50, may have its links engaged selectively by chain link engaging fingers 29. As shown in FIG. 6, by way of example it has been preselected to slip each fourth chain link over elongated cylindrical hollow lamp cord chute 30. Because of the constraints imposed on pivoted head member 27 thus controlling the orientation of chain link engaging fingers 29, on the upward sweep of its arc, chain link engaging fingers 29 will engage a chain link of chain 36 and on top portion of that arc will slide that link of chain 36 over elongated cylindrical hollow lamp cord chute 30. Rotation of head member 27 is contemplated as being in a counterclockwise direction as shown in FIG. 2 and further indicated by arc 43 of FIG. 4.

Referring to FIG. 4, the position of chain link engaging fingers 29 and elongated, cylindrical crosshead shaft 25 show an imminent engagement of a link of chain 36. Two links of chain 36 are already shown as being threaded upon elongated cylindrical hollow lamp cord chute 30. An additional link of chain 36 is about to be engaged by chain link engaging fingers 29 as shown in FIG. 4. It should be understood that the link chosen for capture by elongated, cylindrical hollow lamp cord chute 30, in this illustrative example, four, is a matter of operator choice and by no means is intended to limit the invention. Placement of the mechanism of the device could be chosen so as to select every second, third, fourth or fifth, and so on, link. FIG. 5 shows actual engagement of a link of chain 36 on chain link engaging fingers 29 prior to being placed upon the elongated cylindrical hollow lamp cord chute 30.

Referring now to FIG. 2, it may be noted that subsequent to threading as many links of chain 36 onto elongated, cylindrical hollow lamp cord chute 30 as desired, lamp cord 35 may now be introduced through the hollow interior of elongated cylindrical hollow lamp cord chute 30. As much of an extension of lamp cord 35 through elongated cylindrical hollow lamp cord chute 30, for instance, may be provided as desired. In order to thread lamp cord 35 into the selected links of chain 36 all that is necessary now is to simultaneously draw the lamp cord 35 through the hollow interior of elongated, cylindrical hollow lamp cord chute 30 and withdraw chain 36 from the outside surface of elongated cylindrical hollow lamp cord chute 30. Thus as the links of chain 36 come off of the exterior surface of elongated cylindrical hollow lamp cord chute 30, they will be threaded upon lamp cord 35 and the operation will thus be completed.

Thus, there has been described a method and apparatus for threading chain onto a lamp cord that will automatically thread such a lamp cord into selected links of a lighting fixture chain. Great improvements in maintainability, ease of operation, safety, economy and so forth have been provided through the novel advantages of the invention.

It is here pointed out that although the present invention has been shown and described with reference to particular embodiment, nevertheless various changes and modifications, obvious to one skilled in the art to which the invention pertains, are deemed to lie within the purview of the invention.

What is claimed is:

1. Apparatus for threading a lamp cord chain onto a lamp cord comprising:
    an elongated, cylindrical crosshead shaft, one end portion of which is slidingly constrained to move in a pivoted crosshead, the other end of which is attached to and constrains the movement and orientation of a pivoted head member;
    a driven rotating member pivotally connected to said pivoted head member for driving said pivoted head member in an arc;
    chain link engaging fingers attached to said pivoted head member for engaging and releasing links of a lamp cord chain to be threaded;
    a chain feed fixture for positioning links of a lamp cord chain to be threaded so as to be engaged by said chain link engaging fingers;
    an elongated, cylindrical, hollow lamp cord chute for receiving said lamp cord to be threaded through its hollow interior and positioned so as to receive said links of said lamp cord chain as released from said chain engaging fingers onto its elongated cylindrical exterior;
    means for driving said driven rotating member.

2. The apparatus of claim 1 wherein said means for driving said driven rotating member comprises:
    an electric motor having a rotating output shaft;
    means to control a supply source of electric power to said electric motor; and
    means to transmit the shaft rotation of said electric motor to said driven rotating member.

3. The apparatus of claim 2 wherein said means to transmit the shaft rotation of said electric motor to said driven rotating member comprises:
    a gear box responsive to said shaft rotation of said electric motor and having a rotating output shaft;
    a pulley attached to said rotating output shaft;
    a belt driven by said pulley so as to drive another pulley; and
    a pulley shaft attached to said another pulley and to said driven rotating member whereby said rotating member is caused to rotate whenever said another pulley is driven by said belt.

* * * * *